T. R. POWER.
Car Coupling.
No. 87,366.
Patented March 2, 1869.
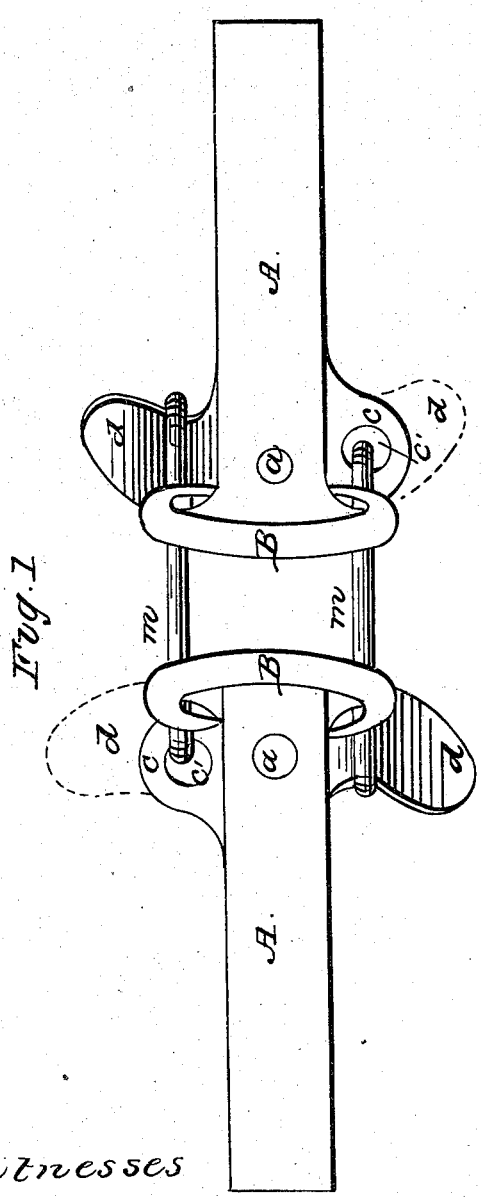
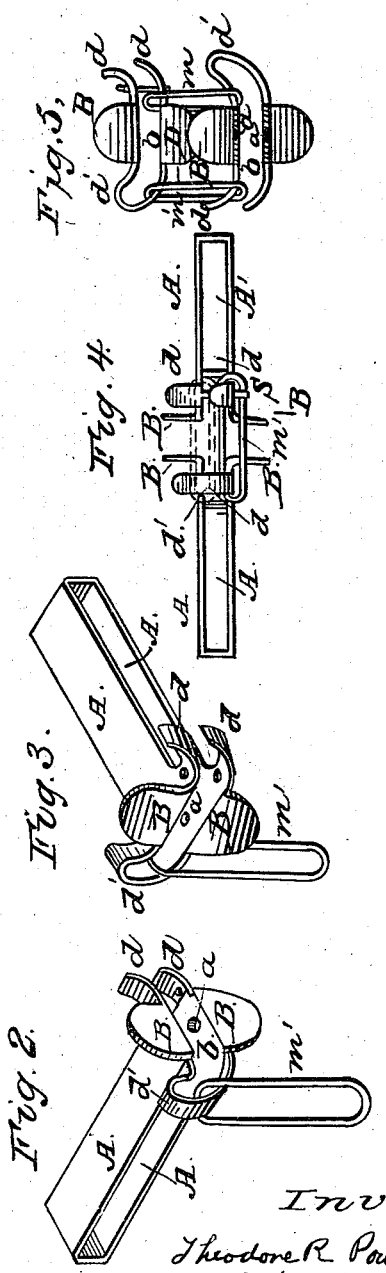
Witnesses
Inventor
Theodore R. Power
by Bakewell & Christy
his Att'ys

THEODORE R. POWER, OF ARSENAL POST OFFICE, PENNSYLVANIA.

Letters Patent No. 87,366, dated March 2, 1869.

IMPROVED CAR-COUPLING.

The Schedule referred to in these Letters Patent and making part of the same.

*To all whom it may concern:*

Be it known that I, THEODORE R. POWER, of Arsenal Post Office, in the county of Allegheny, and State of Pennsylvania, have invented a new and useful Improvement in Car-Coupling; and I do hereby declare the following to be a full, clear, and exact description thereof, reference being had to the accompanying drawing, making a part of this specification, in which—

Figure 1 illustrates, by a plan view, one form of my improvement;

Figures 2 and 3 are perspective views of opposite couplings, so fitted as to illustrate my improvement in its double form of application;

Figure 4 is a side view of the same, showing the different positions of the draw-link; and Figure 5, by a face view of one coupling and a section of the other, just back of the coupling-hooks, shows the operation of my improvement when the couplings of two consecutive cars are not in the same horizontal plane.

Like letters of reference indicate like parts in each.

My invention relates to an improved construction of car-couplings, wherein the opposite sides or bars of the draw-link stand in a vertical, instead of a horizontal plane, and work in that position, so that they are less liable to be broken, and wherein, also, I dispense with the necessity of a draw-bolt, or pin, make a stronger, better, and more durable coupling, and so make it as to adapt it for use with cars whose draw-heads are not in the same horizontal plane, the turning over of the link being all that is necessary in order to couple together the upper part of one draw-head with the lower part of the other; and in such construction of a car-coupling consists the nature of my invention.

To enable others skilled in the art to make and use my invention, I will proceed to describe its construction and mode of operation.

A A, fig. 1, are the top bars of a car-coupling, having a face-plate, B, attached thereto, the latter having the usual apertures for the ordinary link, which is secured in place by pins, or draw-bolts, passing through the holes $a$. The same aperture $b$, and pin, or bolt-holes, $a$, are shown in the other figures for a like purpose. This enables me to use my improved coupling in the ordinary way, whenever desirable.

Extending laterally outward, on each side of either the lower or upper bar, or on each side of both, and solidly attached thereto, so as to be a part thereof, I make hooks, $d$, which curve both backward and upward.

An ordinary link, $m$, is slipped over a hook, $d$, on each of two adjacent draw-heads, or two links may be so used, one on each side, and over two adjacent hooks, and the coupling is complete.

The hooks $d$, curving both backward and upward, the links cannot become disengaged, and I secure the combined strength of two links with each coupling.

But, if so preferred, an eye, $c'$, may be made in one of the hooks, or in a simple lug, $c$, which may take its place, and a link, $m$, be welded in.

Such link or links may then be thrown over a hook, $d$, on the next car-coupling, and when the draw-heads of two adjacent cars are not in the same horizonta plane, as is often the case, a link may be passed over the lower hook of the one and an upper hook of the other, so as to avoid an oblique strain on the link, and always insure a complete coupling.

But in order to render my improvement still more useful, I connect together the upper and lower hooks on one side of each draw-head, or, in other words, make a curved arm, $d'$, which extends from the lower bar $A'$, curving outward and upward above the upper bar $A$, and, by a return curve, joins it, as shown in figs. 3, 4, and 5.

Into or around this curved arm $d'$, I weld a link, $m'$, which is then thrown over either the upper or lower hook $d$ of the opposite draw-head, as may be preferred.

If the draw-heads are both in the same horizontal plane, the link $m'$ may extend from the lower part of the curved arm $d'$ to the lower hook of the opposite draw-head, or the link may be revolved over once, raised to the upper arm $d'$, and passed over the upper hook $d$ of the opposite draw-head; or if the draw-heads are not in the same horizontal plane, as in fig. 5, the link $m'$ may, while occupying either position on its arm $d'$, be passed over the hook on the other draw-head which comes nearest to being on a level with it; and this feature of my invention I consider an important one, that is, so constructing the arm $d'$, that a link hung thereon may be turned, or rotated, so as to have its point of draught in either the upper or lower part, at pleasure, and so as, in either position, to be thrown over a hook on either the upper or lower bar of the next coupling.

A pin, $t$, passing through the hook, $d$, if so desired, may keep the link $m'$ in place.

Another important feature of my invention consists in the fact that I so construct the devices named that the link, when in use, is always vertical. I thus secure its free and full play, and wholly avoid the transverse or breaking-strain to which the draw-link, as ordinarily used, is subject, when the couplings are not in the same level. Also, when the cars are uncoupled, the links $m$ $m'$ hang down, so as to be out of the way in case the cars should be run together, or against each other. I thus save the expense usually incurred by the breaking of draw-links.

The couplings described should, of course, be so arranged, that as they come successively in a train, the curved arms, or connections, $d'$, and hooks $d$, shall alternate with each other. They may be made of either cast or wrought-iron, the latter, on some accounts, being preferable. As already stated, they may be used with the ordinary link and pin, or coupled, in the usual way, to the ordinary bull-nose coupling.

What I claim as my invention, and desire to secure by Letters Patent, is—

1. The hooks $d$, curving backward and upward from either or both edges of the upper or lower bars A A' of a car-coupling, and so made that two adjacent drawheads may be coupled by links passing over the hooks, or by a link, inserted in a lug on one coupling, passing over a hook on the other, substantially as described.

2. A car-coupling, having one or more hooks $d$ on one side, and a curved arm, $d'$, on the other, the latter being so made as to have an upward curve just outside of its intersection with each bar A A', substantially as and for the purposes above set forth.

In testimony whereof, I, the said THEODORE R. POWER, have hereunto set my hand.

T. R. POWER.

Witnesses:
 ELL TORRANCE,
 R. C. WRENHALL.